Patented Feb. 3, 1942

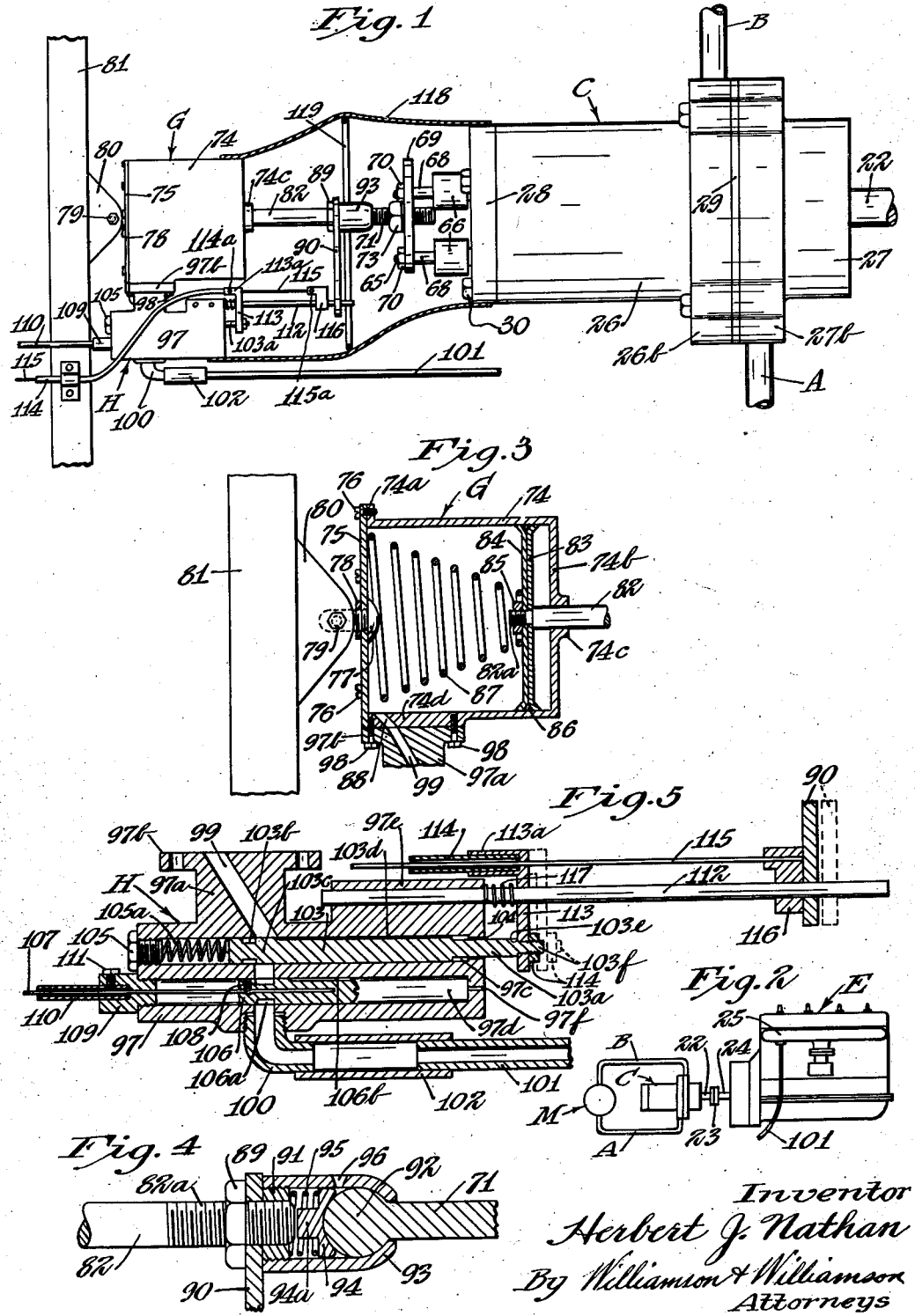

2,272,095

UNITED STATES PATENT OFFICE 2,272,095

SERVOMOTOR AND CONTROL APPARATUS THEREFOR

Herbert J. Nathan, Bismarck, N. Dak.

Application July 28, 1938, Serial No. 221,817

3 Claims. (Cl. 121—38)

My invention relates to fluid pumps and particularly to control apparatus for fluid pumps which are adjustively variable in capacity.

In hydraulic transmission systems for motor vehicles wherein fluid is circulated through wheel-driving fluid motors by a fluid pump driven by an internal combustion engine, it is highly desirable that the fluid pump be conveniently adjustable in capacity to provide for variation of the transmission ratio between the internal combustion engine and the wheels of the vehicle.

An object of my invention is to provide control apparatus for a fluid pump of a type which is conveniently adjustable in capacity through a range between maximum output and substantially zero output.

Another object is to provide such a control means capable of being actuated by vacuum in the intake manifold of an internal combustion engine employed for driving the pump to automatically vary the capacity of the pump in proportion to variation in said vacuum.

Still another object is to provide such control means with additional control facilities for selectively limiting the maximum capacity for which the pump may be adjusted by said control means.

Yet another object is to provide such pump control apparatus including still another control device for use to reduce the pump output to substantially zero independently of all other control means.

Another object is to provide such pump control means adapted for operation by control elements similar to the pedals with which automotive vehicles are customarily equipped.

A further object is to provide control means of light, simple, compact, efficient, rugged and inexpensive construction.

These and other objects and advantages of the invention will more fully appear from the following description made in connection with the accompanying drawing, wherein like reference characters refer to the same or similar parts, and in which:

Fig. 1 is a general top view of an adjustable capacity pump and an embodiment of my control apparatus included as a portion thereof;

Fig. 2 is a simplified side view of an engine pump and a fluid motor suitable for operative association of my control apparatus therewith;

Fig. 3 is a horizontal longitudinal sectional view of the pneumatic shifting device of my control apparatus;

Fig. 4 is a horizontal sectional view of a detail of my control apparatus; and

Fig. 5 is a horizontal sectional view of the vacuum-controlling valve device of my control apparatus with certain parts thereof shown in one position in full lines and in another position in dotted lines.

While my pump control apparatus is adapted for use with fluid pumps for various purposes it is particularly adapted for use in automotive vehicles having a hydraulic propulsion system. Referring to the drawing Fig. 1 shows an embodiment of my invention. The pump shown includes a casing C, a fluid inlet connection or conduit A, a fluid outlet connection or conduit B, and a shaft 22 for driving a pump. Fig. 2 shows in a simplified manner the pump identified by the letter C and an engine E having a power output shaft 24 connected through coupling means 23 to the driving shaft or power input shaft 22 of the pump C. The engine E is of the internal combustion type having an intake manifold 25 which is connected to my pump control apparatus for purposes of control thereof. The inlet and outlet conduits A and B of the pump C are connected to one or more fluid motors M which may be connected to the wheels of a vehicle for use in imparting driving torque thereto.

Referring to Fig. 1 the casing of the pump C includes a relatively long cylindrical body 26, a relatively short cylindrical body 27, an end wall 28, and a circular plate 29. The shorter cylindrical body 27 is aligned with one end of the longer cylindrical body 26 and the plate 29 is placed between the cylindrical bodies 26 and 27. The end wall 28 is placed on the remaining end of the longer cylindrical body 26. The end wall 28, the body 26, the plate 29, and the body 27 are held together by means of nutted bolts 30 so that they are sealed to one another and together form a rigid generally cylindrical pump housing or casing. The portions of the bodies 26 and 27 adjoining each other are increased in diameter to form annular outwardly projecting members 26b and 27b.

The drive shaft 22 of my pump is disposed coaxially of the casing C and extends longitudinally thereof from a point outwardly of the exteriorly disposed end of the cylindrical body 27 to a centrally located point toward the inner side of the end wall 28.

Means operable from a point located exteriorly of the pump C is provided for shifting internal parts of the pump C for varying the capacity thereof. Three shifting elements 68 disposed parallel to each other project outwardly of the pump C through suitable apertures in the end wall 28. For cooperating with each of the shifting elements 68, a sealing means 66 is provided for each thereof for sealing the same to the end wall 28 of the pump C. Since the pump C and the sealing means 66 include no structure therewithin constituting a part of the invention residing in my pump control apparatus, the internal construction of these devices need not be described or illustrated in this application.

Immediately to the left of the shifting elements 68 a yoke 69 is provided and the elements 68 extend through and are secured in suitable respective apertured portions of the yoke 69. The elements 68 are screw-threaded at their left-hand ends and nuts 70 are applied to the screw-threaded ends of the elements 68. A single operating rod 71 for moving the yoke 69 is provided. The rod 71 is externally screw-threaded in a portion of it disposed in the immediate vicinity of the yoke 69, and is screw-threadedly engaged in a suitable centrally located internally screw-threaded apertured portion of the yoke 69. To the left of the yoke 69 a washer 72 is placed on the operating rod 71. To the left of the washer 72 a nut 73 is provided on the operating rod 71. The nut 73 is provided to lock the rod 71 in any desired screw-threadedly adjusted position of the same relative to the yoke 69.

Referring to Figs. 1 and 3 of the drawing a pneumatically operable device G is provided for moving the operating rod 71 for the purpose of varying the capacity of the pump C. The device G consists of a piston accommodating cylinder 74 closed at its rear end by a plate 75 secured to a flange 74a on the cylinder 74 by suitable means such as the screws 76. The closure plate 75 is centrally apertured and a headed screw 77 extends outwardly through the apertured portion of the plate 75 with the head of the screw disposed at the inner side of the plate 75. Immediately outwardly of the plate 75 a nut 78 is placed on the screw 77 to rigidly secure the same to the plate 75. The screw 77 is flattened and apertured in its free end portion and in this portion is connected by means of a pivot bolt 79 to a bracket 80 carried by a portion 81 of the frame of the vehicle in which the pump C is installed. The forward end of the cylinder 74 is provided with a closure wall 74b carrying on its outer side a centrally located boss 74c, the bossed portion of the wall 74b being centrally apertured and having a piston rod 82 extending therethrough. The inner end 82a of the piston rod 82 is of reduced diameter to form a shoulder and is screw-threaded. A pair of disks 83 and 84 are centrally apertured and are carried on the inner end portion 82a of the piston rod 82. The disks 83 and 84 are secured to the screw-threaded portion of the piston rod 82 by a nut 85 screw-threadedly mounted on the threads of the portion 82a of the piston rod 82. At their marginal portions the disks 83 and 84 are flared away from each other to form an annular groove of triangular cross-section. The annular groove carries therein an annular sealing member 86 formed of relatively flexible and compressible material. A helical compression spring 87 is placed within the interior of the cylinder 74 and bears at its respective ends against the closure plate 75 and the disk 84. The normal position of the piston formed by the disks 83 and 84 and the sealing ring 86 will then be substantially as shown in Fig. 3; that is, closely adjacent the end wall 74b of the cylinder 74. A portion 74d of the cylinder 74 adjacent the closure plate 75 is thickened and is formed at its outer side into a flat surface. A port 88 is provided by forming an aperture through the thickened portion 74d for the purpose of enabling communication with the interior of the cylinder 74. When the port 88 is connected to a source of vacuum the piston of the operating device G will be shifted to the left as viewed in Fig. 3 against the pressure of the spring 87. This movement of the piston will, of course, result in increasing the output of the pump.

Means is provided connecting the piston rod 82 to the operating rod 71 of the pump in axially aligned relation therewith. The free end portion 82a of the piston rod 82 is externally screw-threaded and carries thereon a nut 89. An apertured end of a bar 90 is placed on the threaded portion 82a of the piston rod 82 immediately outwardly of the nut 89. Outwardly of the bar 90 an element 91 which is both internally and externally screw-threaded is screwed on to the piston rod 82 in tightened relation with the bar 90 and the nut 89. The free end of the previously described operating rod 71 is formed into a ball 92. A cup 93 screwed on to the element 91 at its open end is provided with an aperture at its remaining end through which the operating rod 71 extends with the ball 92 disposed within the interior of the cup 93. To the left of the ball 92 as viewed in Fig. 4 is an element 94 having a recess in its right-hand side conforming to the contour of the ball 92. The element 94 is of such diameter as to fit within the cup 93 in the manner of a piston. The element 94 has a reduced diameter portion 94a projecting toward the free end of the piston rod 82 and spaced therefrom but a slight distance. A helical compression spring 95 is interposed between the element 94 and the element 91 so as to maintain the element 94 in spring-urged engagement with the left-hand side of the ball 92. The ball 92 and the parts associated therewith comprise a ball and socket joint. For lubrication of the ball and socket joint thus formed an oil hole 96 is formed in the wall of the cup 93 as shown.

For control of communication between the port 88 of the pneumatic operating device G and a source of vacuum such as the intake manifold 25 of the engine E, I provide valve apparatus H such as shown in Fig. 5. The device H consists of a body 97 having a projecting portion 97a carrying an apertured flange 97b which is secured to the flat exterior surface of the cylinder 74 of the device G by suitable means such as the cap screws 98. The body 97 has therewithin a pair of parallel elongated bores 97c and 97d. The bores 97c and 97d are of cylindrical shape and extend from the left-hand (as viewed in Fig. 5) end of the body 27 to points closely adjacent the right-hand limit of the body 97. The bore 97c is disposed closer than the bore 97d to the neck 97a of the body 97. The body 97 is provided with a passage 99 therethrough registering with the port 88 of the device G and extending through the body 97 to diametrically intersect first the bore 97c and then the bore 97d. The outer end of the passage 99 is provided with a connection fitting 100 to which a tube 101 leading from the intake manifold 25 of the engine E may be connected by means of a connecting element 102. An elongated cylindrical element 103 is disposed in the first bore 97c in closely fitting but longitudinal sliding relation thereto. At its right-hand end the element 103 has a portion 103a of reduced diameter projecting outwardly of the body 97 through an aperture 104 formed in the right-hand end of the body 97 coaxially of the bore 97c and having a diameter somewhat in excess of the diameter of the outwardly projecting reduced portion 103a of the element 103. The shoulder provided at the junction between the full diameter portion of the element 103 and the reduced diameter portion 103a acts as a stop engageable with portions of the body 97 bordering the aperture 104 for the purpose of determining the right-hand limit of movement of the element 103. The left-hand end of the bore 97c is provided with a plug 105 screw-threadedly engaged in internal screw-threads formed in the left-hand end of the portion of the body 97 defining the bore 97c. A helical compression spring 105a is interposed between the plug 105 and the left-hand end of the element 103 for the purpose of yieldably urging the element 103 toward its right-hand limit of movement. The element 103 has therein an annular groove 103b so located relative to the length of the element 103 as to be aligned with the passage 99 when the element 103 is at its right-hand limit of movement. Adjoining the groove 103b at the right-hand side thereof a portion 103c of the element 103 having a length approximately equal to the diameter of the passage 99 is ungrooved to act as a valve for partially blocking flow of air through the passage 99 when said ungrooved portion 103c is placed in registry with the passage 99. Obviously when the element 103 is shifted to its right-hand limit of movement the annular groove 103b serves to conduct air between portions of the passage 99 disposed at opposite sides thereof. From the right-hand limit of the ungrooved portion 103c of the element 103 to the right-hand end of the full diameter portion of the element 103 a longitudinally extending groove 103d is formed in the element 103 in the side thereof nearest the pneumatic device G. The groove 103d serves to permit admission of air through the aperture 104 and the groove 103d into the cylinder 74 of the device G when the element 103 is shifted to a position slightly to the left of the position in which it is shown in Fig. 5.

The right-hand end of the bore 97d is provided with a small air admitting aperture 97f through the right-hand end of the body 97. Within the bore 97d there is provided a somewaht elongated cylindrical element 106 closely but longitudinally slidably fitting the portions of the body 97 defining the bore 97d. The element 106 has near the left-hand end thereof an annular groove 106a for permitting passage of air between portions of the passage 99 at opposite sides thereof when the element 106 is in the position shown in Fig. 5. To the right of the groove 106a the element 106 is ungrooved through an axial distance approximately equal to the diameter of the passage 99 so that the passage 99 will be blocked when said ungrooved portion is in registry therewith. To the right of the ungrooved portion of the element 106 a longitudinally extending groove 106b is formed in the side of the element 106 nearest the previously described elongated element 103. The groove 106b is for the purpose of admitting air through the aperture 97f, the bore 97d and the groove 106b into the passage 99 when the element 106 is so positioned that the groove 106b is in communication with the passage 99. For operation of the valve element 106 a control wire 107 is received in a suitable aperture in the element 106 as shown and is secured in the aperture by means of a set screw 108. A centrally apertured plug 109 is screw-threadedly mounted in the left-hand end of the portion of the body 97 defining the bore 97d. The wire 107 extends outwardly of the body 97 through the apertured plug 109. A casing 110 for the control wire 107 is received in an enlarged outer portion of the aperture in the plug 109 and is secured therein by means of a set screw 111. The control wire 107 and the casing 110 therefor may be extended to any desired suitable type of control element manipulatable by the operator of the vehicle in which my pump is incorporated. This control means is used for the purpose of enabling the operator to set the pump for minimum output regardless of the position in which the valve element 103 may happen to be disposed. I prefer that the control wire 107 be connected to the brake pedal of the vehicle so that the pump will be automatically reduced in capacity to a minimum when the brake pedal is depressed for the purpose of applying brakes.

The body 97 includes a portion 97e projecting from the main portion of the body 97 to a moderate distance toward the pneumatic control device G. The portion 97e carries therein a rod 112 extending to the right therefrom, the outer end of the rod being extended through an aperture in the free end of the bar 90 which is carried by the piston rod 82 of the pneumatic device G. The bar 90 is movable longitudinally of the rod 112 responsive to the longitudinal movement of the control rod 71 of the pump. The outer end portion of the cylindrical valve element 103 is shouldered at 103e and provided with screw-threads 103f outwardly of the shoulder 103e. A flat member 113 which is apertured in its medial portion and mounted in its apertured portion on a rod 112 for sliding movement longitudinally thereof is apertured at its lower end as viewed in Fig. 5 and is mounted on the screw-threaded portion 103f of the valve element 103. The flat member 113 is secured to the outer portion of the valve element 103 by means of a nut 114. The upper end of the flat member 113 as viewed in Fig. 5 carries a socket member 113a wherein a flexible casing 114 containing a control wire 115 is secured by means such as the set screw 114a. The flat member 113 is apertured for extension of the control wire 115 therethrough toward the bar 90. An abutment element 116 is mounted on the rod 112 for longitudinal movement therealong between the flat member 113 and the bar 90 and the end of the wire 115 is secured to the element 116 by means such as the set screw 114a. The control wire 115 and casing 114 may be extended to and connected to any suitable control element adapted for operation by the operator of a vehicle in which my apparatus is incorporated to shift the wire 115 longitudinally of the casing 114 and hold the wire 115 in any adjusted longitudinally shifted relation with the flexible casing 114. This control element may be similar to the well known frictionally restrained button control device which is commonly used in nearly all present day automobiles as a hand throttle or choke control device or similar to well known hand control pull button devices which have been widely used to control radiator shutters, muffler cut-out valves and other devices through a pull wire in a flexible casing. Manipulation of the control wire 115 to shift the same longitudinally of the casing 114 is utilized to effect adjustive variation in the distance between the flat member 113 and the abutment element 116. The casing 114, being flexible, will move, at the corresponding end thereof with the flat member 113 to accommodate said shifting and variation. When the wire 115 is held in an adjusted longitudinally shifted relation with the casing 114, the distance between the abutment element in which the wire 115 is secured and the flat member 113 in which the casing 114 is secured is adjustively fixed since the wire 115 is of such strength as to prevent stretching or buckling of the portion thereof extending through said distance and the wire 115 is retrained against longitudinal movement in the flexible casing 114. As the flat member 113 moves relative to the valve body 97 the flexible casing 114 and the wire 115 therewithin will bend together as a unit in portions thereof immediately to the left of the flat member 113. As the operating rod 71 is moved to the left to increase the output of the pump the bar 90 will be moved therewith to the left, as for example from the dotted line position shown in Fig. 5 to the full line position. The bar 90 functions as an abutment for element 116. When the bar 90 has engaged the abutment element 116, the abutment element 116 will move with the bar 90 as the bar 90 is moved still further to the left. During the last mentioned movement the leftward movement of the abutment element 116 is transmitted through the control wire 115 and casing 114 to the flat member 113 and to the valve element 103. Movement of the valve element 103 to the left will first block communication between the connection element 100 and the interior of the cylinder 74 of the pneumatic operating device G. This will prevent further movement of the piston rod 82 to the left. If the valve element 103 is moved sufficiently to the left the groove 103d therein will conduct air to the passage 99 and from the same into the cylinder 75 to admit air thereto, and accordingly permit the spring 87 to push the piston rod 82 to the right for reducing the capacity of the pump. In the position shown in Fig. 3 it will be noted that there is a slight degree of communication between air passage 103d and passage 99. Initial movement of the piston 83 causes movement of the valve 103 to the position shown in Fig. 5. The slight flow communication between said passages 103d and 99 permits flow of air into the chamber G to increase pressure therein and permit further movement of the piston 38 slightly to the right. This will move the valve 103 to a position where a degree of communication is afforded from air passage 99 through air passage 103d to the conduit 100 which is connected to the source of reduced pressure. This variation of the valve 103 due to pressure changes will result in an approximate balance and a slight degree of communication will still be afforded between air passage 103d and passage 99. A drop in applied suction permits the bleeding of air from passage 103d through passage 99 to the left-hand side of piston 83. A helical compression spring 117 is placed on the rod 112 between the flat member 113 and the portion 97e of the body 97. The purpose of this spring 117 is to afford yielding resistance to leftward movement of the flat member 113 beyond the point where the air admitting groove 103d of the valve element 103 comes into communication with the passage 99. The abutment member 90 and abutment element 116 operate cooperatively in such a manner that the valve 103 will be operated to prevent movement of the control rod 71 to the left appreciably beyond a point where the abutment member 90 engages the abutment element 116. It then follows that the control wire 115 may be adjustively operated to adjustively determine the maximum output of the pump. For example, when it is desired to start a vehicle having my pump incorporated therein in association with an engine E and wheel driving motors M, the control wire 115 may be projected to such a distance that the pump will have a minimum output per revolution and hence produce a transmission ratio between the engine E and wheels driven by the motors M corresponding to the transmission ratio obtained in the conventional motor vehicle when the gears are placed in what is commonly known as low gear. As the vehicle starts to move and increase its speed of movement the wire 115 may be retracted to permit successively higher outputs of the pump to change the transmission ratio between the engine E and wheels driven by the motors M toward a ratio corresponding to that obtained in the conventional motor vehicle when the transmission gears thereof are set in what is commonly known as high gear.

The output of the pump is also varied responsive to changes in the degree of vacuum existing in the intake manifold 25. This output variation obtained responsive to variation in manifold vacuum is such as to automatically decrease the output of the pump responsive to increased load such as would be occasioned by a vehicle reaching and ascending a hill. The reduction in output of the pump, of course, produces a change in transmission ratio such that the engine E will produce a greater number of revolutions than before relative to the number of revolutions of the motor M. The manner in which this variation in transmission ratio is effected is as follows. The variable device H is first assumed to be in such condition that the interior of the cylinder 74 of the pneumatic device G is in communication with the intake manifold 25 and will hence have therewithin a degree of vacuum corresponding to the degree of vacuum in the intake manifold 25. As the vehicle encounters a hill the torque required from the motor M and hence the torque developed by the engine E is increased. This will cause a reduction in the degree of vacuum in the manifold 25 and in the cylinder 74. Reduction in vacuum will enable the spring 87 to push the piston rod 82 to the right to such a point that the pressure of the spring 87 will be equal to the pull of the vacuum on the piston of the device G. This movement of the piston 84 to the right results in reduction of the output of the pump C, and accordingly alters the transmission ratio to provide a greater mechanical advantage between the engine E and the wheels driven by the motors M. When the vehicle proceeds from an upward slope on to a level road the vacuum in the manifold 25 and in the cylinder 74 will tend to increase due to reduction in the torque required of the engine E. This increase in vacuum will suck the piston of the device G to the left until the suction on the piston equals the pressure afforded by the spring 87. This leftward movement, of course, increases the output of the pump and reduces the number of revolutions of the engine E relative to the revolutions of the wheels of the vehicle. The engine E may, of course, be provided with a throttle of conventional type and provided with a throttle control accessible to the operator of the vehicle. With my automatic control it should be apparent that less variation in throttle position will be required than is necessary in operation of conventional motor vehicles when the road conditions vary.

For the purpose of excluding dust a cover 118 which may be formed, if desired, of flexible material and be in tubular form is placed on the casing C of the pump at one end and on the device G and H at its other end. A supporting ring for the medial portion of the dust shield 118 may be provided if desired and this ring 119 may be rigidly attached to any convenient means of support.

For convenient operation of the control wire 115 I prefer that the same be connected to a pedal corresponding in nature and location to the usual clutch pedal of conventional motor vehicles and be retracted responsive to depressing the pedal so that the pump output will be substantially zero when the pedal is depressed fully.

While I have described my automatic control apparatus for variable capacity fluid pump as associated with parts of a motor vehicle it should be apparent that the pump control means is readily adaptable for use in apparatus other than motor vehicles.

It is apparent that I have invented a novel, efficient, effective and compact type of control apparatus for variable capacity fluid pumps wherein particularly effective automatic control means are included.

It will, of course, be understood that various changes may be made in the form, details, arrangement and proportions of the various parts without departing from the scope of my invention, which generally stated, consists in the matter shown and described and set forth in the appended claims.

What is claimed is:

1. Positioning apparatus consisting of, the combination of a pneumatic device having a shiftable element carrying a control member, said shiftable element being associated with a chamber so as to be deflected in one direction responsive to vacuum produced in said chamber, resilient means yieldably urging said shiftable element in the opposite direction, valve means for controlling communication between said chamber and a source of vacuum, resilient means for yieldably holding said valve open relative to said communication, a shiftable operating member for said valve having an abutment element carried thereby, and an abutment member carried by said control member and aligned with said abutment element for engaging the same to cause closure of said valve relative to said communication at a pre-determined point in movement of said shiftable element in said one direction so as to halt said movement at said point, and said valve being arranged to connect said chamber to the atmosphere when in a closed position relative to said communication between said chamber and a source of vacuum.

2. Positioning apparatus consisting of, the combination of a pneumatic device having a shiftable element carrying a control member, said element being associated with a chamber so as to be deflectible in one direction responsive to vacuum produced in said chamber, resilient means yieldingly urging said element in the opposite direction being included in said pneumatic device, valve means for controlling communication between said chamber and a source of vacuum and including two valves connected in series, each of said valves being arranged to connect said chamber to the atmosphere when in fully closed position relative to said communication, resilient means for yieldably holding one of said valves open relative to said communication, a shiftable operating member for said one valve having an abutment element carried thereby, and an abutment member connected with said control member to shift therewith and aligned with said abutment element for engaging the same to cause closure of said one valve relative to said communication at a predetermined point in shifting movement of said shiftable element in said one direction to halt said movement at said point, the second of said valves being arranged for manual operation thereof.

3. Positioning apparatus consisting of, the combination of a pneumatic device having a shiftable element carrying a control member, said element being associated with a chamber so as to be deflectible in one direction responsive to vacuum produced in said chamber, resilient means yieldingly urging said element in the opposite direction being included in said pneumatic device, a valve for controlling communication between said chamber and a source of vacuum, resilient means for yieldably holding said valve open relative to said communication, a shiftable operating member for said valve having an abutment element carried thereby, and an abutment element connected with said control member to shift therewith and aligned with said first-mentioned abutment element for engaging the same to cause closure of said valve relative to said communication at a predetermined point in movement of said shiftable element in said one direction to halt said movement at said point, one of said abutment elements being adjustively movable relative to the corresponding one of said members in the direction of relative movement of said abutment elements to enable selective variation of the position of said predetermined point.

HERBERT J. NATHAN.